United States Patent [19]

Klotz et al.

[11] 4,092,078
[45] May 30, 1978

[54] ELASTIC CONNECTION FOR AN AXIAL JOINT WITH CONNECTING LINKAGE OF A MOTOR VEHICLE STEERING GEAR

[75] Inventors: Werner Klotz, Diepholz; Georg Kindel, Lemforde, both of Germany

[73] Assignee: Lemförder Metallwaren AG, Lemforde, Germany

[21] Appl. No.: 776,177

[22] Filed: Mar. 10, 1977

[30] Foreign Application Priority Data

Dec. 7, 1976 Germany .............................. 2655353

[51] Int. Cl.² ............................................. F16F 1/38
[52] U.S. Cl. .................................... 403/221; 403/226; 403/287; 403/133; 280/95 R
[58] Field of Search ............... 403/221, 226, 228, 287, 403/291, 122, 133, 77, 76, 140; 280/96, 95 R, 673, 674

[56] References Cited

U.S. PATENT DOCUMENTS

| 1,867,364 | 7/1932 | Lee ....................................... 403/226 |
| 2,719,017 | 9/1955 | Mordarski et al. .............. 403/226 X |
| 3,368,852 | 2/1968 | Herbenar et al. ................ 403/228 X |
| 3,950,006 | 4/1976 | Wood, Jr. ......................... 403/133 X |

*Primary Examiner*—Andrew V. Kundrat

*Attorney, Agent, or Firm*—McGlew and Tuttle

[57] ABSTRACT

An elastic connection of an axial joint with the connecting linkage of a motor vehicle steering gear, comprises a housing which has an opening at each end with one end opening into a spherical cavity for supporting the ball head of an axial joint and the opposite end opening into a cylindrical cavity. The cylindrical cavity contains an inner metal sleeve which is adapted to be connected to a connecting linkage which is held in position by an elastic bearing bushing which is firmly adhered thereto, such as by vulcanizing. The outer periphery of the elastic bushing is secured to a steering part secured in the cylindrical recess of the housing. The inner sleeve includes an annular collar adjacent the opening at the cylindrical recess end of the housing at a location adjacent the end which is formed with a downturned flange of both the housing and the outer bearing sleeve part. The elastic bearing bushing has a lip portion which engages over an end of the inner sleeve and another lip portion which engages over the collar and has a finishing surface opposed to the inturned flanges of the outer sleeve and the housing. The inner end of the outer sleeve abuts against the partition wall separating the two cavities in the housing and the elastic bearing bushing is advantageously engaged with this end.

5 Claims, 1 Drawing Figure

U.S. Patent   May 30, 1978   4,092,078
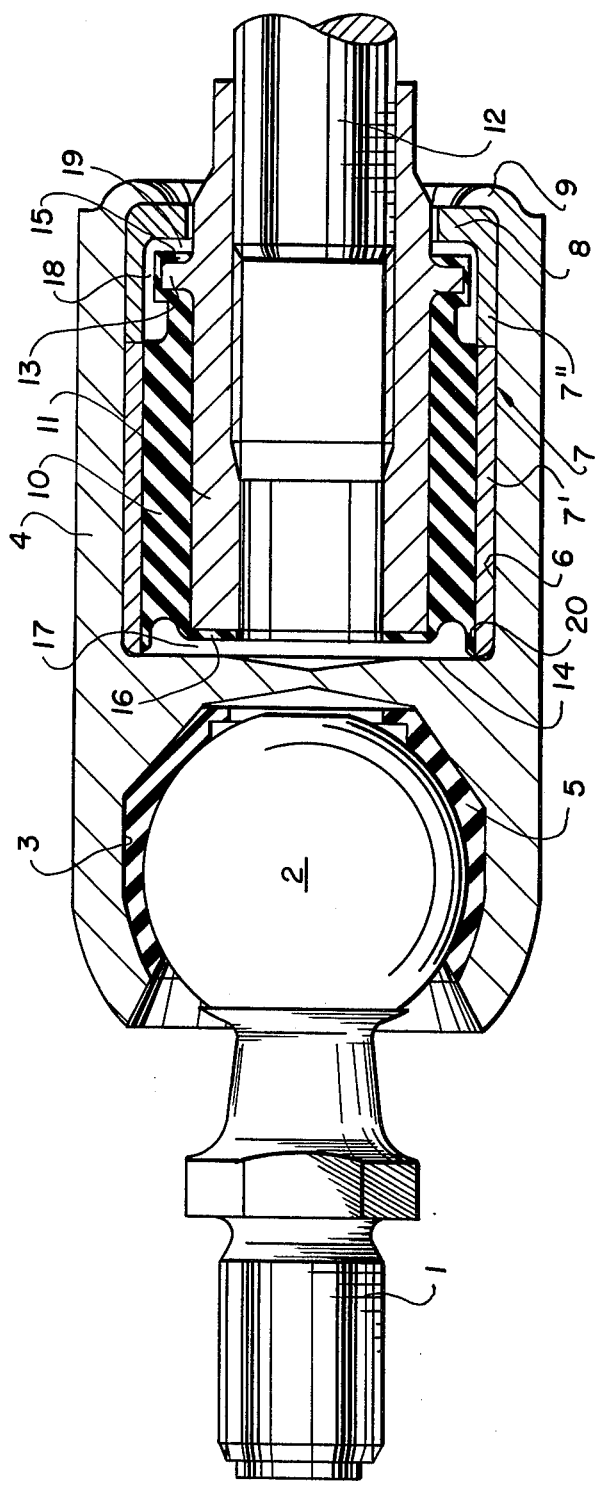

ELASTIC CONNECTION FOR AN AXIAL JOINT WITH CONNECTING LINKAGE OF A MOTOR VEHICLE STEERING GEAR

FIELD AND BACKGROUND OF THE INVENTION

This invention relates in general to the construction of pivot joint bearing assemblies and, in particular, to a new and useful elastic connection of an axial joint with the connecting linkage of a vehicle steering gear.

DESCRIPTION OF THE PRIOR ART

The present invention relates in particular to an elastic connection of an axial joint with the connecting linkage of a motor vehicle steering gear, wherein the axial forces are transmitted by a bearing bushing of elastomeric material acting as a thrust spring. The bushing is firmly clamped between two metal sleeves or is vulcanized in, and is arranged together with, the latter, in a joint housing which at the same time receives the axial joint. The outer metal sleeve which is supported on its one end on the bottom of the joint housing, comprises an annular flange directed radially inwardly at its opposite end. The inner metal sleeve which is arranged in spaced relation to the bottom of the joint housing carries at its end adjacent to the annular flange of the outer sleeve, an abutment collar, in spaced relation to the annular flange and is directed radially outwardly.

In a known connection of this kind, the elastic bearing bushing transmitting the axial forces and stressed under thrust is so designed and arranged that it takes support by its one end against the abutment collar of the metallic inner sleeve and by its other end against the bottom of the joint housing. A clearance is provided between the housing side sleeve end and the bottom of the joint housing, as well as between the abutment collar of this sleeve, and the annular flange of the metallic outer sleeve, to permit the necessary thrust movement of the elastic bushing.

By the unilateral elastic support of the elastic intermediate bushing against the housing bottom, an elastic transmission of the axial forces to the joint housing is achieved to some slight extent. However, for greater forces, especially if they occur abruptly, this support is insufficient, inasmuch as the housing side end of the metal sleeve still knocks against the housing bottom, causing a clattering noise which is transmitted undamped to the metallic bottom of the joint housing. Since in the known design, no elastic support at all is provided between the annular collar of the inner metal sleeve and the annular flange of the outer sleeve, the axial forces in this region are transmitted without any damping to the metallic outer sleeve and, hence, to the joint housing, so that bothersome clatter is increased.

SUMMARY OF THE INVENTION

The present invention avoids the disadvantages of the known devices and provides an elastic connection which by simplest means, and without any additional cost of construction, ensures a noiseless transmission of axial forces occurring abruptly in particular.

According to the invention, this problem is solved in that the elastic bearing bushing presents lip-type extensions at its ends which embrace the collar of the inner metal sleeve in spaced relation to the annular flange of the outer metal sleeve, and also extends inwardly over the abutting edge of the end of the inner metal sleeve farther inward in the housing with axial spacing from the housing bottom.

A further feature of the invention provides that the extension enclosing the annular collar of the inner metal sleeve is spaced from the cylindrical inner face of the outer sleeve in the radial plane as well.

According to a special feature of the invention, it is further expedient to provide the bearing bushing at its end toward the joint housing bottom with a second lip-type extension, which extends axially out of the outer shell of the bearing bushing and is adhered to the inner face of the outer metal sleeve up to the housing bottom.

A further feature of the invention consists in that the lip-type extensions are in one piece with the elastic bearing bushing and are also connected by adhering with the matching faces of the inner metal sleeve.

Another feature of the invention is seen in that the outer metal sleeve consists of two parts separated from each other in the transverse direction.

Accordingly, it is an object of the invention to provide an elastic connection of an axial joint with the connecting linkage of a motor vehicle steering gear which includes an inner metal sleeve which is adapted to be connected to a linkage part which is arranged in an opening of one end of the housing in alignment with a ball head which is supported in a spherical cavity opening at the other end of the housing, and which also includes an outer bearing sleeve in the joint containing the inner sleeve with an elastic bushing disposed between the outer bearing sleeve and the inner sleeve and wherein the housing and the outer sleeve are bent downwardly to form a flange which is spaced axially from a collar formation on the inner sleeve and wherein, further, the bearing bushing is securely adhered both to the inner sleeve and the outer sleeve, and includes a lip portion extending over the end of the inner sleeve and a lip portion extending over the collar.

A further object of the invention is to provide an elastic connection for an axial joint with a connecting linkage of a motor vehical steering gear which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference should be had to the accompanying drawing and descriptive matter in which there is illustrated a preferred embodiment of the invention.

BRIEF DESCRIPTION OF THE DRAWING

The only FIGURE of the drawing is a partial axial sectional view of an elastic connection between a universally pivoted joint member and a connecting linkage of a steering gear of a vehicle, constructed in accordance with the invention.

DESCRIPTION OF THE PREFERRED EMBODIMENT

As can be seen from the drawing, the ball-and-socket joint comprises a link pin 1 with a spherical head 2 mounted by means of an elastic liner 5 in a hollow sphere recess 3 of the joint housing 4. The opposite end of the joint housing has a recess or blind bore 6 and a metallic sleeve 7 which is expediently composed of two bearing parts 7', 7", which is split in transverse direction in order to facilitate the installation of the bearing parts into the bore 6. The sleeve section 7" is provided with an annular flange 8 directed radially inwardly. After assembly of the bearing parts 7', 7" into bore 6, sleeve 7 is held in place by the edge 9 of the joint housing beaded over the annular flange 8. An inner metal sleeve 11 is mounted in the outer metal sleeve 7, with interposition of a bearing bushing 10 of elastic material. Sleeve 11 receives the end 12 of a connecting linkage, for example, the tie rod (not shown in detail) of a vehicle steering gear. On its section directed outward from the housing, the sleeve 11 carries an encircling collar 13 which is arranged in axially spaced relation to the annular flange 8 of outer sleeve 7. Inner sleeve 11 is arranged in the outer sleeve 7 so that an axial distance remains also between the outermost edge of the inner sleeve and the bottom 14 of joint housing 4, so that the inner sleeve 11 is axially movable in both directions, namely, in the range of the thrust movements determined by the elasticity of bearing bushing 10. The bearing bushing 10 serves as a thrust spring which is firmly connected with the two metal sleeves, preferably by vulcanization. Bushing 10 also acts as a damping element relative to radially acting loads.

Bearing bushing 10 has lip-type extensions or overlapping portions 15 and 16 at each end forming thin elastic seatings firmly embracing one end of the inner metal sleeve 11 at one end, and the annular collar 13 at the opposite end. Between the outer faces of the seatings 15 and 16, an adequate distance for the tie rod movement is left, both relative to the adjacent surface of the housing bottom 14, and relative to the inner faces of the cap portion 7" of the outer metal sleeve 7, surrounding the annular collar 13. These clearances are makred 17, 18 and 19 and provide the necessary play for the axial movement of the inner metal sleeve 11. If major axial forces occur, especially abruptly, and if then alternately, the collar 13 abuts on the annular flange 8 of the outer sleeve 7 and the end of the metal housing 11 farther inward in the housing on the housing bottom 14, metallic contact between the matching surfaces is avoided, and the impacts are damped and transmitted almost noiselessly due to the interposed elastic seatings.

Lastly, the elastic bearing bushing 10 may be provided at its end toward the housing bottom 14 with an axially extending extension 20, which is contiguous to the outer shell of the bushing 10 in the manner of a lip and bears against the housing bottom 14. This mades possible an additional elastic support for the inner metal bushing 11.

All lip-type extensions are of one piece with the elastic bearing bushing and are likewise adheringly connected by vulcanization with the corresponding surfaces of the metal bushings.

While a specific embodiment of the invention has been shown and described in detail to illustrate the application of the principles of the invention, it will be understood that the invention may be embodied otherwise without departing from such principles.

What is claimed is:

1. An elastic connection of an axial joint with the connecting linkage of a motor vehicle steering gear, comprising a joint housing having first and second end walls, a ball socket cavity defined in said housing adjacent said first end wall and having an opening in said first end wall for accommodating the axial joint, a connecting linkage bearing cavity defined in said housing in longitudinally spaced relationship to said ball-socket cavity and having an opening in said second end wall, said housing having a partition wall between said ball-socket cavity and said connecting linkage bearing cavity, a bearing sleeve in said connecting linkage bearing cavity, a linkage sleeve located within and spaced readially inwardly from said bearing sleeve in said connecting linkage bearing cavity, said bearing sleeve having an inner end bearing against said partition wall, an elastic bearing bushing disposed between said bearing sleeve and said linkage sleeve and firmly secured at its inner periphery to said linkage sleeve and its outer periphery to said bearing sleeve, said linkage sleeve having an annular collar projecting radially outwardly therefrom adjacent to, but spaced inwardly from, the second opening, said housing and said bearing sleeve having inturned abutting flanges extending radially inwardly abounding the second opening and spaced longitudinally from said collar, said elastic bearing bushing having a first lip extension at one end extending over the axially inner end of said linkage sleeve and a second lip extension extending over said collar.

2. An elastic connection, according to claim 1, wherein said second lip extension is spaced from the inner face of said bearing sleeve in the radial plane.

3. An elastic connection, according to claim 1, wherein said elastic bearing bushing has an end portion which extends axially inwardly from the inward end of said bearing sleeve into engagement with the inner end of said linkage sleeve, said bearing sleeve having an end abutting against said partition wall.

4. An elastic connection, according to claim 1, wherein said bearing bushing comprises a single elastic member which is vulcanized to the respective bearing sleeve and said linkage sleeve.

5. An elastic connection, according to claim 1, wherein said outer bearing sleeve comprises two sleeve parts separated from each other in a transverse direction.

* * * * *

Disclaimer 4,092,078.—*Werner Klotz*, Diepholz, and *Georg Kindel*, Lemforde, Germany. ELASTIC CONNECTION FOR AN AXIAL JOINT WITH CONNECTING LINKAGE OF A MOTOR VEHICLE STEERING GEAR. Patent dated May 30, 1978. Disclaimer filed Apr. 12, 1979, by the assignee, *Lemförder Metallwaren AG*.

Hereby enters this disclaimer to the entire term of said patent.

[*Official Gazette June 19, 1979.*]